(12) United States Patent  (10) Patent No.: US 7,406,652 B2
Tseng et al.  (45) Date of Patent: Jul. 29, 2008

(54) METHOD AND CIRCUIT FOR REDUCING SATA TRANSMISSION DATA ERRORS BY ADJUSTING THE PERIOD OF SENDING ALIGN PRIMITIVES

(75) Inventors: Pao-Ching Tseng, Hsin Chu (TW); Shu-Fang Tsai, Hsin Chu (TW); Chuan Liu, Jen Te Hsiang (TW)

(73) Assignee: Mediatek Inc., Hsin Chu (TW)

( * ) Notice: Subject to any disclaimer, the term of this patent is extended or adjusted under 35 U.S.C. 154(b) by 742 days.

(21) Appl. No.: 11/039,923

(22) Filed: Jan. 24, 2005

(65) Prior Publication Data

US 2005/0268199 A1  Dec. 1, 2005

(30) Foreign Application Priority Data

Apr. 30, 2004 (TW) ............................... 93112283 A

(51) Int. Cl.
*G06F 11/00* (2006.01)

(52) U.S. Cl. ..................... 714/798; 714/56; 714/746

(58) Field of Classification Search ................ 370/360, 370/351; 360/69; 714/4, 798, 56, 746
See application file for complete search history.

(56) References Cited

U.S. PATENT DOCUMENTS

| 7,320,084 | B2 * | 1/2008 | Steinmetz et al. ............... 714/4 |
| 2004/0100944 | A1 * | 5/2004 | Richmond et al. ........... 370/360 |
| 2004/0252672 | A1 * | 12/2004 | Nemazie ..................... 370/351 |
| 2005/0146804 | A1 * | 7/2005 | Von Bokern et al. .......... 360/69 |

\* cited by examiner

*Primary Examiner*—David Ton
(74) *Attorney, Agent, or Firm*—Muncy, Geissler, Olds & Lowe, PLLC

(57) ABSTRACT

A method and circuit for reducing SATA (Serial Advanced Technology Attachment) transmission data errors by adjusting the period of sending two consecutive ALIGN Primitives. The method reads a counting value of an 8b/10b coding error counter at a predetermined period and adjusts the period of sending two consecutive ALIGN Primitives according to the counting value. Because the system dynamically adjusts the period of sending two consecutive ALIGN Primitives according to the channel condition, the SATA transmission data errors can be reduced.

26 Claims, 4 Drawing Sheets

| sending device | receiving device | description |
|---|---|---|
| SYNC | SYNC | |
| SYNC | SYNC | |
| X_RDY | SYNC | Ready for sending data in sending device |
| X_RDY | SYNC | |
| X_RDY | R_RDY | Ready for receiving data in receiving device |
| X_RDY | R_RDY | |
| SOF | R_RDY | Packet start |
| Payload 0 | R_RDY | |
| Payload 1 | R_IP | |
| ... | ... | |
| Payload n | R_IP | |
| CRC | R_IP | |
| EOF | R_IP | Packet end |
| WTRM | R_IP | |
| WTRM | R_IP | |
| WTRM | R_OK | Receive-OK |
| WTRM | R_OK | |
| SYNC | R_OK | |
| SYNC | R_OK | |
| SYNC | SYNC | |

FIG. 2 (Related Art)

METHOD AND CIRCUIT FOR REDUCING SATA TRANSMISSION DATA ERRORS BY ADJUSTING THE PERIOD OF SENDING ALIGN PRIMITIVES

This application claims the benefit of the filing date of Taiwan Application Ser. No. 093112283, filed on Apr. 30, 2004, the content of which is incorporated herein by reference.

BACKGROUND OF THE INVENTION

1. Field of the Invention

The invention relates to a method and a device for reducing SATA transmission data errors, and more particularly to a method and device for reducing SATA transmission data errors by adjusting the period of sending ALIGN Primitives.

2. Description of the Related Art

The serial ATA (Serial Advanced Technology Attachment, hereinafter referred to as SATA) is an interface specification promoted by the companies of APT, Dell, IBM, Intel, Maxtor, Seagate, etc. The SATA specification is applied to the interface of a hard disk drive or an optical disk drive to replace parallel ATA/ATAPI interface that has been used for a long time. The SATA interface specification specifies two pairs of differential signal lines to replace the original 40 or 80 signal lines connected in parallel. Serializing the original data can reduce the size and voltage and increase the speed. The specification also introduces some new functions, such as flow control and error resending, to control the data stream.

FIG. 1 is a schematic illustration showing communication layers in the SATA specification. As shown in FIG. 1, the SATA interface connects a host 11 to a device 12. The device 12 may be an optical storage device or a hard disk drive, or other devices with the SATA interface. The communication layers in the SATA specification include four layers, which are respectively a first layer (physical layer), a second layer (link layer), a third layer (transport layer) and a fourth layer (application layer). The physical layer is responsible for converting digital and analog signals. That is, the physical layer receives and converts a digital signal sent from the link layer into an analog signal and sends the analog signal to the other side. The physical layer also receives and converts the analog signal, which comes from the other side, into a digital signal and outputs the digital signal to the link layer. The link layer encodes and decodes the digital data. That is, the link layer encodes the data coming from the transport layer and outputs the encoded data to the physical layer. On the other hand, the link layer decodes the data coming from the physical layer and outputs the decoded data to the transport layer. The transport layer constructs and deconstructs the FIS (Frame Information Structure). The detailed definition of the FIS can be found in the SATA specification. The application layer is in charge of buffer memory and DMA engine(s).

During the serializing process, the sending device converts the parallel data (e.g., data in bytes or words) into a serial bit data stream. In addition to the typical data, the SATA specification defines some data control codes with four bytes, which are referred to as primitives, for controlling the sending and power management of the sending device and the receiving device. For example, a X_RDY primitive (transmission data ready primitive) represents that the sending device is ready to send data, and a R_RDY primitive (receiver ready primitive) represents that the receiving device is ready to receive data.

FIG. 2 is a schematic illustration showing a packet sent through the SATA interface. Two devices communicate with each other to send the packet according to the X_RDY primitive (transmission data ready primitive) and the R_RDY primitive (receiver ready primitive). Then, the sending side sends a packet content, which is packed by a SOF primitive (start of frame) and an EOF primitive (End of frame). After the packet content is sent completely, the sending side sends a WTRM primitive (wait for frame termination primitive). If there is no any error about the CRC (Cyclic Redundancy Check) check in the link layer, the receiving side responds with a R_OK primitive (reception with no error primitive) after it receives the WTRM primitive. If there is an error about the CRC check, the receiving side responds with a R_ERR primitive (reception error).

In order to let the receiving device distinguish the beginning position of the serialized data, the SATA specification defines an ALIGN Primitive for the synchronization of the physical layer at the receiving side and for searching of the beginning bit. The sending side is specified to send at least two consecutive ALIGN Primitives within 256 double words.

However, this new interface specification still cannot impeccably process the noise interference. For example, if the received ALIGN Primitive has been polluted by noise, the physical layer may not be able to correctly find the initial bit of each double word in the following data stream such that the system receives a series of error data until the next ALIGN Primitive is correctly decoded. The malfunctioned range is proportional to the period of the appeared ALIGN Primitives.

SUMMARY OF THE INVENTION

It is therefore an object of the invention to provide a method and a device for reducing SATA transmission data errors by adjusting the period of sending ALIGN Primitives.

To achieve the above-mentioned object, the invention provides a method of reducing SATA errors by adjusting the period of sending ALIGN Primitives. The invention comprises the steps of reading a counting value of an 8b/10b coding error counter at a predetermined period, and adjusting the frequency of sending ALIGN Primitives according to the counting value. When the counting value is 0, the system sends two ALIGN Primitives every 256 double words. When the counting value is not 0, the time interval for sending two ALIGN Primitives is shorter as the counting value gets larger. For example, when the counting value ranges from 1 to 4, the system sends two ALIGN Primitives every 128 double words. When the counting value ranges from 5 to 16, the system sends two ALIGN Primitives every 8 double words. When the counting value ranges from 17 to 255, the system sends two ALIGN Primitives every three double words. When the counting value is greater than 255, the system initializes the physical layer and rebuilds the connection.

Instead of sending two ALIGN Primitives every 256 double words, the system dynamically adjusts the period of sending two ALIGN Primitives according to the channel condition, so the SATA transmission data errors will be reduced.

BRIEF DESCRIPTION OF THE DRAWINGS

FIG. 2 is a schematic illustration showing a packet sent through the SATA interface.

DETAILED DESCRIPTION OF THE INVENTION

The method and device of the invention for reducing SATA errors by adjusting the period of sending ALIGN Primitives will be described with reference to the accompanying drawings.

The SATA specification only specifies that at least two consecutive ALIGN Primitives have to be sent within 256 double words and does not further specify the period of sending the ALIGN Primitive when an error occurs. If an ALIGN Primitive is polluted, the physical layer may not correctly find the initial bit of each double word in the following data stream, and the system will receive a series of erroneous data. The consecutive error cannot be overcome until the next ALIGN Primitive comes. In order to solve this problem, the invention utilizes a counting value of an 8b/10b coding error counter to adjust the period of sending two consecutive ALIGN Primitives. That is, the period of sending two consecutive ALIGN Primitives is shorter as the counting value gets larger such that the malfunctioned time will be shortened. The so-called 8b/10b coding error counting value is the number of error data generated when the link layer of the system is performing the 8b/10b decoding procedure. Therefore, the embodiment of the invention utilizes the counting value of the 8b/10b coding error counter as the reference for judging the level of the noise. Of course, other data capable of serving as the reference of the noise level also may be used in the invention.

Figure 1:
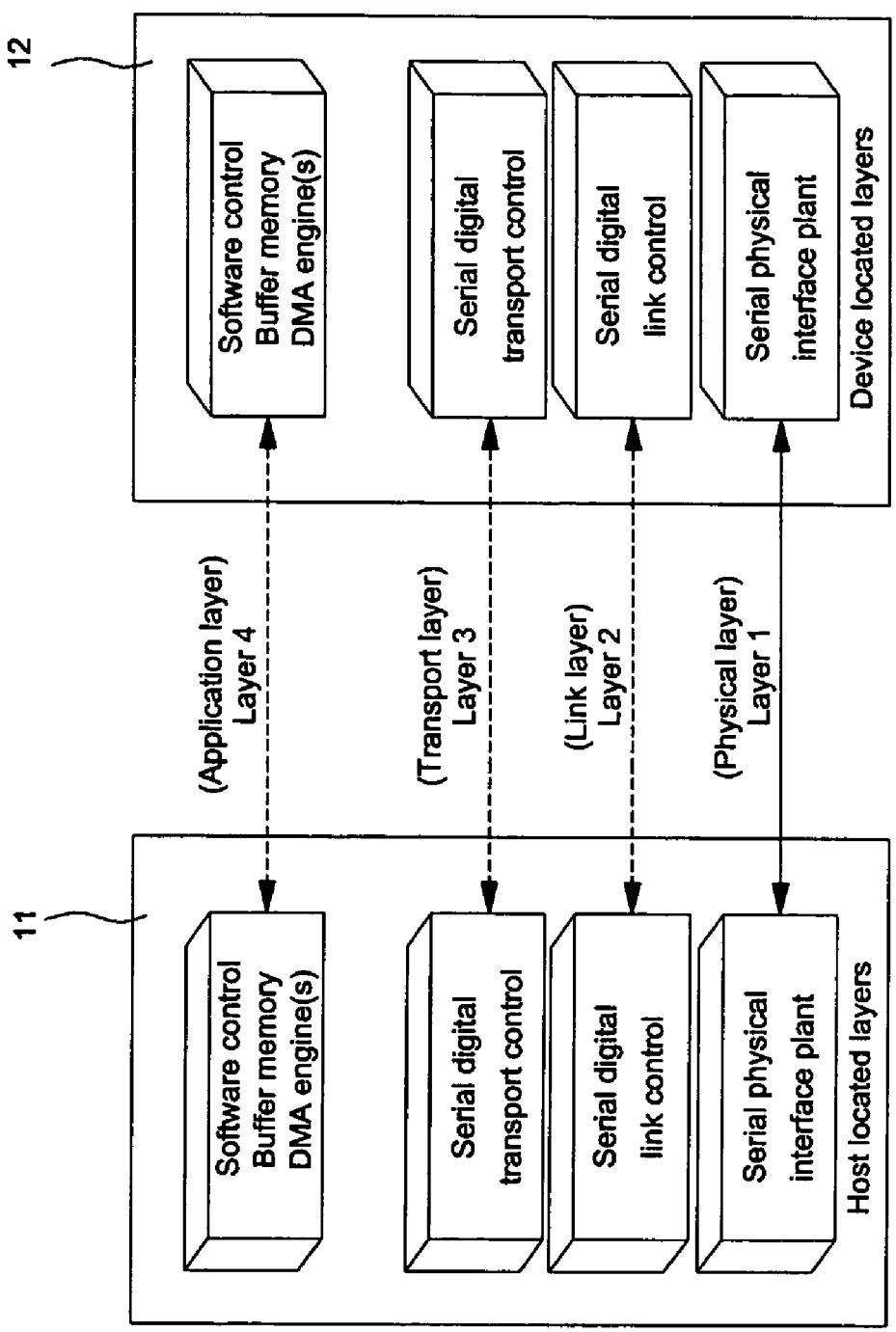
FIG. 1 is a schematic illustration showing communication layers in the SATA specification.
Figure 3:
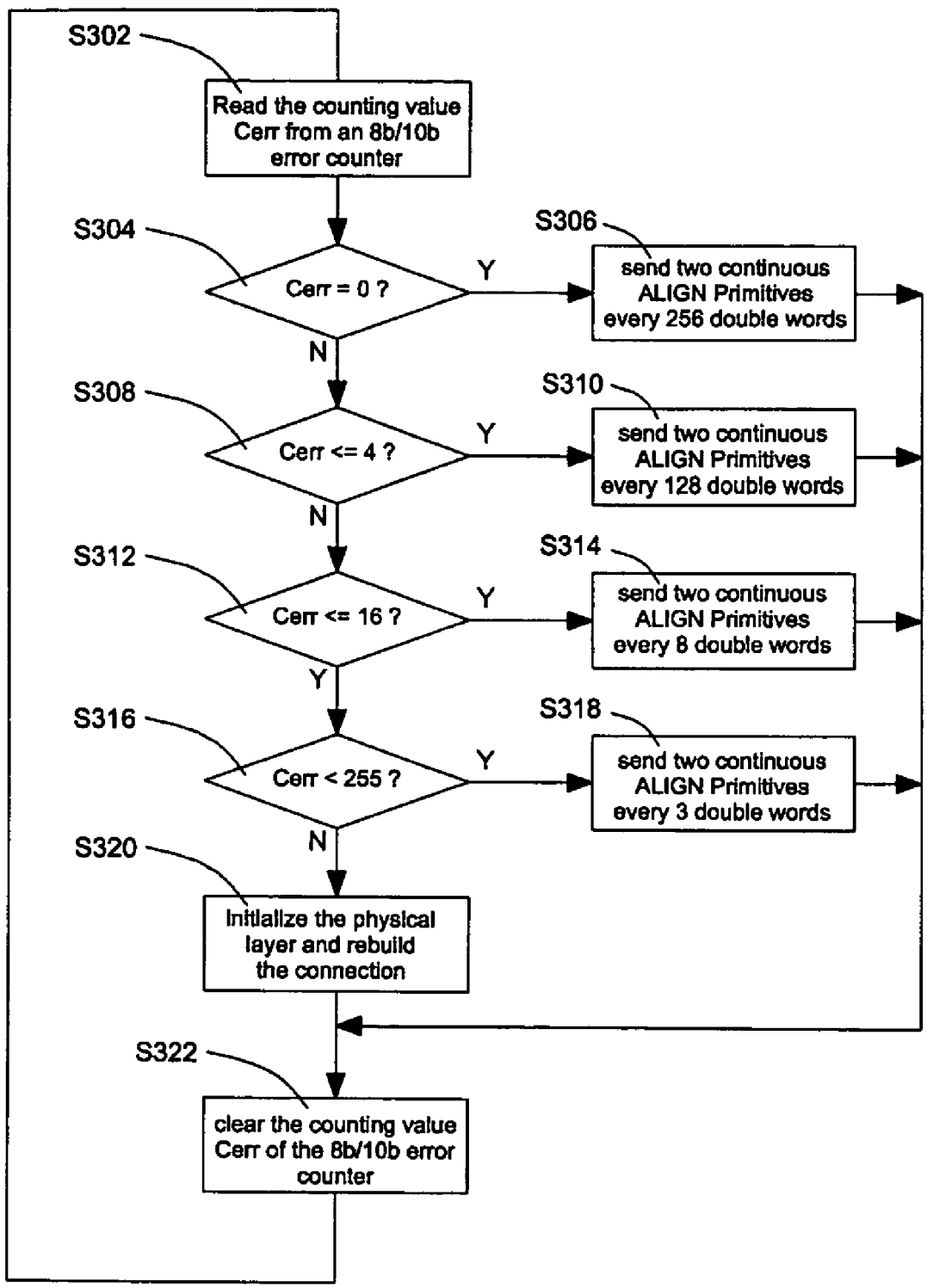
FIG. 3 is a flow chart showing a method of the invention for reducing SATA transmission data errors by adjusting the period of sending ALIGN Primitives.

FIG. 3 is a flow chart demonstrating a method of the invention for reducing SATA transmission data errors by adjusting the period of sending ALIGN Primitives. The invention utilizes the counting value of the 8b/10b coding error counter to adjust the period of sending two consecutive ALIGN Primitives.

Step S302: read the counting value Cerr from an 8b/10b coding error counter. The system reads the counting value Cerr of the 8b/10b coding error counter at a default period T. For example, the default period T is 20 ms. The 8b/10b coding error counter counts the number of illegitimate coding error caused by noises on the signal line. The counting value Cerr may also be generated according to the noise on the channel.

Step S304: judge whether the counting value Cerr is 0. If the counting value Cerr is 0, it represents that the noise on the signal line is very low, and the process jumps to step S306. If the counting value Cerr is greater than 0, it represents that there are noises on the signal line and the process jumps to step S308.

Step S306: send two consecutive ALIGN Primitives every 256 double words and then jump to step S322.

Step S308: judge whether the counting value Cerr is smaller than or equal to a first threshold value. If the counting value Cerr is smaller than or equal to the first threshold value (e.g., 4), the process jumps to step S310. If the counting value Cerr is greater than the first threshold value, the process jumps to step S312.

Step S310: send two consecutive ALIGN Primitives every D1 (e.g. 128) double words and then jump to step S322.

Step S312: judge whether the counting value Cerr is smaller than or equal to a second threshold value (e.g. 16). If the counting value Cerr is smaller than or equal to the second threshold value, the process jumps to step S314. If the counting value Cerr is greater than the second threshold value, the process jumps to step S316.

Step S314: send two consecutive ALIGN Primitives every D2 (e.g. 8) double words and then jump to step S322.

Step S316: judge whether the counting value Cerr is smaller than or equal to a third threshold value (e.g. 254). If the counting value Cerr smaller than or equal to the third threshold value, the process jumps to step S318. If the counting value Cerr is greater than the third threshold value, the process jumps to step S320.

Step S318: send two consecutive ALIGN Primitives every D3 (e.g. 3) double words and then jump to step S322.

Step S320: initialize the physical layer and rebuild the connection. When the counting value Cerr is greater than a third threshold value, it represents that the signal noise exceeds the allowable level. So, the invention initializes the physical layer and rebuilds the connection so as to transmit the data again. The so-called initialization of the physical layer is to regenerate an initial signal (e.g., COMINIT or COMRESET) such that the physical layer executes the initialization procedure again to readjust the analog circuit and to calibrate the impedance of the high-frequency signal unit so as to ensure that the data can be correctly received. The initialization procedure is the prior art, and detailed steps can be found in the SATA specification.

Step S322: clear the counting value Cerr of the 8b/10b error counter and then jump back to step S302.

Therefore, the system of the invention can dynamically adjust the period of sending two consecutive ALIGN Primitives so as to adjust the malfunctioned time caused by the interfered ALIGN Primitive according to the above-mentioned steps.

Figure 4:
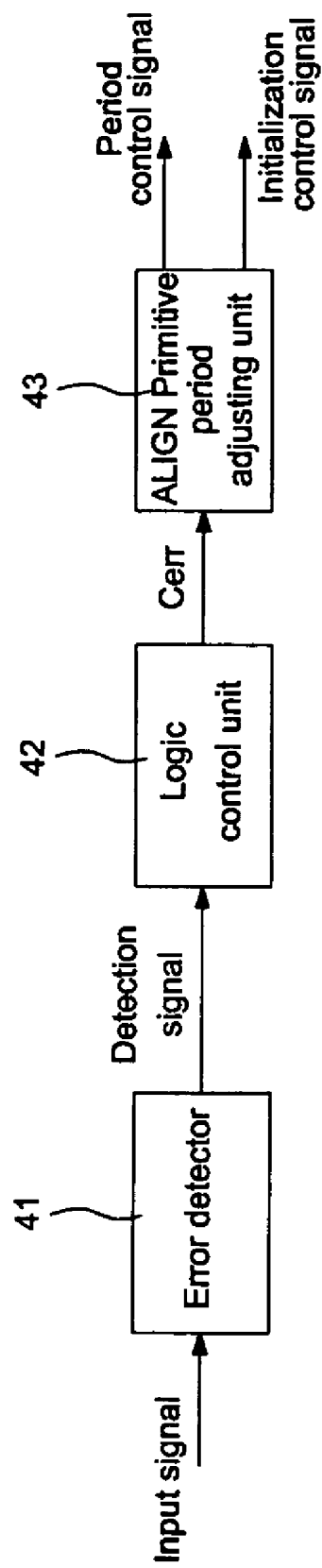
FIG. 4 is a block diagram showing a circuit of the invention for reducing SATA transmission data errors by adjusting the period of sending ALIGN Primitives.

FIG. 4 is a block diagram showing a circuit of the invention for reducing SATA transmission data errors by adjusting the period of sending ALIGN Primitives. Referring to FIG. 4, the circuit of the invention for reducing SATA errors by adjusting the period of sending ALIGN Primitives includes an error detector 41, a logic control unit 42 and an ALIGN Primitive period adjusting unit 43.

The error detector 41 detects the illegitimate coding error, and generates a detection signal. The error detector 41 can generate a pulse in the detection signal when the illegitimate coding error is detected. The logic control unit 42 receives the detection signal of the error detector 41 and outputs the number of error in a default period. The logic control unit 42 may be a counter for counting the number of pulses of the detection signal as a counting value Cerr. The ALIGN Primitive period adjusting unit 43 receives the counting value Cerr of the logic control unit 42 and generates a period control signal and an initialization control signal to set the period of sending two consecutive ALIGN Primitives or to perform an initialization operation of the physical layer according to the counting value Cerr.

For example, when the counting value Cerr is 0, the ALIGN Primitive period adjusting unit 43 sets the period of sending two consecutive ALIGN Primitives as 256 double words. When the counting value Cerr ranges from 1 to 4, the ALIGN Primitive period adjusting unit 43 sets the period of sending two consecutive ALIGN Primitives as 128 double words. Of course, the relationship between the periods of the counting value Cerr and the period of sending two consecutive ALIGN Primitive also may be adjusted according to the actual condition. The ALIGN Primitive period adjusting unit 43 can output the period control signal, and the system can store the period control signal in a register and send two consecutive ALIGN Primitives according to the value of the register. In addition, when the counting value Cerr exceeds a maximum threshold value, the ALIGN Primitive period adjusting unit 43 further enables an initialization control signal. The system initializes the physical layer and rebuilds the connection when the initialization control signal is enabled.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for reducing SATA (Serial Advanced Technology Attachment) transmission data errors by adjusting the period of sending ALIGN Primitives, the method comprising the steps of:
reading an error counting value at a predetermined period;
sending two consecutive ALIGN Primitives every D0 double words when the error counting value is 0; and
sending two consecutive ALIGN Primitives every D1 double words when the error counting value is greater than 0, wherein D1 is smaller than D0.

2. The method according to claim 1, wherein the error counting value is generated by counting 8b/10b coding errors.

3. The method according to claim 1, wherein the error counting value is generated according to the noise level on the channel.

4. The method according to claim 1, wherein D0 is 256.

5. The method according to claim 1, further comprising the steps of initializing the physical layer and rebuilding the connection when the error counting value is greater than a threshold value.

6. A method for reducing SATA transmission data errors by adjusting the period of sending ALIGN Primitives, the method comprising the steps of:
reading an error counting value at a predetermined period;
sending two consecutive ALIGN Primitives every D0 double words when the error counting value is 0;
sending two consecutive ALIGN Primitives every D1 double words when the error counting value is greater than 0 and smaller than or equal to a first threshold value; and
sending two consecutive ALIGN Primitives every D2 double words when the error counting value is greater than the first threshold value, wherein D1 is smaller than D0 and D2 is smaller than D1.

7. The method according to claim 6, wherein the error counting value is generated by an counting 8b/10b coding errors.

8. The method according to claim 6, wherein the error counting value is generated according to the noise level on the channel.

9. The method according to claim 6, wherein D0 is 256.

10. The method according to claim 6, further comprising the steps of initializing the physical layer and rebuilding the connection when the error counting value is greater than a second threshold value.

11. A method for reducing SATA transmission data errors by adjusting the period of sending ALIGN Primitives, the method comprising the steps of:
reading an error counting value at a predetermined period;
sending two consecutive ALIGN Primitives every D0 double words when the error counting value is 0;
sending two consecutive ALIGN Primitives every D1 double words when the error counting value is greater than 0 and smaller than or equal to a first threshold value;
sending two consecutive ALIGN Primitives every D2 double words when the error counting value is greater than the first threshold value and smaller than or equal to a second threshold value; and
sending two consecutive ALIGN Primitives every D3 double words when the error counting value is greater than the second threshold value, wherein D1 is smaller than D0, D2 is smaller than D1, and D3 is smaller than D2.

12. The method according to claim 11, wherein the error counting value is generated by counting 8b/10b coding errors.

13. The method according to claim 11, wherein the error counting value is generated according to the noise level on the channel.

14. The method according to claim 11, wherein D0 is 256.

15. The method according to claim 11, further comprising the steps of initializing the physical layer and rebuilding the connection when the error counting value is greater than a third threshold value.

16. A circuit for reducing SATA transmission data errors by adjusting the period of sending ALIGN Primitives, the circuit comprising:
an error detector for detecting illegitimate coding errors caused by noise, and generating a detection signal;
a logic control unit for receiving the detection signal and generating a control value according to the detection signal; and
an ALIGN Primitive period adjusting unit for generating a period control signal according to the control value so as to adjust the period for sending ALIGN Primitives.

17. The circuit according to claim 16, wherein when the error detector detects the illegitimate coding errors caused by the noise on the signal line, a pulse is generated in the detection signal to indicate data error.

18. The circuit according to claim 17, wherein the logic control unit counts the number of pulses of the detection signal and outputs a counting value as the control value.

19. The circuit according to claim 18, wherein the logic control unit outputs the counting value at a default period and then recounts.

20. The circuit according to claim 16, wherein the period of two consecutive ALIGN Primitives is 256 double words when the control value is 0.

21. The circuit according to claim 16, wherein the period of two consecutive ALIGN Primitives is 128 double words when the control value ranges from 1 to a first threshold value.

22. The circuit according to claim 21, wherein the period of two consecutive ALIGN Primitives is 8 double words when the control value ranges from the first threshold value to a second threshold value.

23. The circuit according to claim 16, wherein when the control value exceeds a maximum threshold value, the ALIGN Primitive period adjusting unit enables an initialization control signal so as to initialize the physical layer and to rebuild the connection.

24. A method for reducing SATA transmission data errors by adjusting the period of sending ALIGN Primitives, the method comprising the steps of:
reading an error counting value at a predetermined period;
sending two consecutive ALIGN Primitives every D0 double words when the error counting value is smaller than or equal to a first threshold value; and
initializing the physical layer and rebuilding the connection when the error counting value is greater than the first threshold value.

25. The method according to claim 24, wherein the error counting value is generated according to the noise level on the channel.

26. The method according to claim 24, wherein the error counting value is generated by an 8b/10b coding error counter.

* * * * *